United States Patent
Maekawa et al.

(10) Patent No.: US 9,382,367 B2
(45) Date of Patent: Jul. 5, 2016

(54) POLYMER ELECTROLYTE MEMBRANE COMPOSED OF AROMATIC POLYMER MEMBRANE BASE AND METHOD FOR PRODUCING THE SAME

(75) Inventors: Yasunari Maekawa, Ibaraki (JP); Shin Hasegawa, Ibaraki (JP); Yasuyuki Suzuki, Ibaraki (JP)

(73) Assignee: JAPAN ATOMIC ENERGY AGENCY, Ibaraki (JP)

( * ) Notice: Subject to any disclaimer, the term of this patent is extended or adjusted under 35 U.S.C. 154(b) by 1112 days.

(21) Appl. No.: 12/310,287

(22) PCT Filed: Aug. 24, 2007

(86) PCT No.: PCT/JP2007/066482
§ 371 (c)(1),
(2), (4) Date: Feb. 19, 2009

(87) PCT Pub. No.: WO2008/023801
PCT Pub. Date: Feb. 28, 2008

(65) Prior Publication Data
US 2009/0325027 A1    Dec. 31, 2009

(30) Foreign Application Priority Data

Aug. 24, 2006 (JP) .................. 2006-227935

(51) Int. Cl.
| | |
|---|---|
| H01M 8/10 | (2016.01) |
| C08J 5/22 | (2006.01) |
| C08F 283/04 | (2006.01) |
| C08F 273/00 | (2006.01) |
| C08F 283/06 | (2006.01) |
| C08F 289/00 | (2006.01) |
| C08F 291/00 | (2006.01) |
| C08J 7/16 | (2006.01) |
| C08L 51/08 | (2006.01) |
| H01B 1/12 | (2006.01) |
| H01M 8/02 | (2016.01) |

(52) U.S. Cl.
CPC ............. *C08F 283/04* (2013.01); *C08F 273/00* (2013.01); *C08F 283/06* (2013.01); *C08F 289/00* (2013.01); *C08F 291/00* (2013.01); *C08J 5/2268* (2013.01); *C08J 7/16* (2013.01); *C08L 51/08* (2013.01); *H01B 1/122* (2013.01); *H01M 8/0221* (2013.01); *H01M 8/103* (2013.01); *H01M 8/1025* (2013.01); *H01M 8/1027* (2013.01); *H01M 8/1032* (2013.01); *H01M 8/1072* (2013.01); *H01M 8/1088* (2013.01); *C08J 2387/00* (2013.01); *H01M 2300/0082* (2013.01); *Y02E 60/521* (2013.01); *Y02P 70/56* (2015.11)

(58) Field of Classification Search
CPC .... C08F 273/00; C08F 283/04; C08F 283/06; C08F 289/00; C08F 291/00; C08J 5/2268; C08J 7/16; C08J 2387/00; C08L 51/08; H01B 1/122; H01M 8/1025; H01M 8/1027; H01M 8/103; H01M 8/1032; H01M 8/1072; H01M 8/1088; H01M 2300/0082; H01M 8/0221
USPC ............... 429/33, 317, 316; 521/27; 525/471, 525/418, 535, 417
See application file for complete search history.

(56) References Cited

U.S. PATENT DOCUMENTS

| | | | |
|---|---|---|---|
| 6,692,858 B2 * | 2/2004 | Higuchi et al. | ............... 429/494 |
| 2004/0191602 A1 * | 9/2004 | Ishikawa et al. | ................. 429/33 |
| 2004/0197613 A1 * | 10/2004 | Curlier et al. | ................... 429/14 |
| 2005/0049320 A1 | 3/2005 | Yoshida et al. | |
| 2006/0105216 A1 | 5/2006 | Nagai et al. | |
| 2006/0134493 A1 * | 6/2006 | Yoshida et al. | ................. 429/33 |

FOREIGN PATENT DOCUMENTS

| | | |
|---|---|---|
| JP | 2005-78849 | 3/2005 |
| JP | 2006-140086 | 6/2006 |
| JP | 2006/179301 | 7/2006 |

OTHER PUBLICATIONS

International Search Report for PCT/JP2007/066482, mailed Oct. 2, 2007.

* cited by examiner

Primary Examiner — Ling Choi
Assistant Examiner — Chun-Cheng Wang

(57) ABSTRACT

Provision of, and a method for production of, a polymer electrolyte membrane, which is characterized by introducing a vinyl monomer into an aromatic polymer membrane substrate, typified by polyether ether ketone, polyether imide, or polysulfone, as graft chains by graft polymerization, and then chemically converting some of the graft chains or/and part of the aromatic polymer chain into sulfonic groups.

14 Claims, No Drawings

POLYMER ELECTROLYTE MEMBRANE COMPOSED OF AROMATIC POLYMER MEMBRANE BASE AND METHOD FOR PRODUCING THE SAME

CROSS REFERENCE TO RELATED APPLICATIONS

This application claims the benefit under 35 U.S.C. Section 371, of PCT International Application Number PCT/JP2007/066482, filed Aug. 24, 2007 and Japanese Application No. 2006-227935 filed Aug. 24, 2006 in Japan, the contents of which are incorporated herein by reference.

TECHNICAL FIELD

This invention relates to the provision of a polymer electrolyte membrane by graft-polymerizing a vinyl monomer to an aromatic polymer membrane, which is a substrate, then chemically converting the graft chains or/and the aromatic polymer chain into sulfonic groups, the polymer electrolyte membrane being suitable for use in a polymer electrolyte fuel cell, and having excellent proton conductivity, mechanical characteristics, oxidation resistance, and fuel impermeability; and a method for producing the polymer electrolyte membrane.

BACKGROUND ART

A fuel cell using a polymer electrolyte membrane is operated at a low temperature of 150° C. or lower, and has a high power efficiency and a high energy density. Thus, such a fuel cell is expected to serve as a power source for mobile instruments, a power source for home-oriented cogeneration, or a power source for fuel cell vehicles (automobiles), which utilizes methanol, hydrogen or the like as a fuel. In connection with the fuel cell, important component technologies on polymer electrolyte membranes, electrocatalysts, gas-diffusion electrodes, and membrane-electrode assemblies are existent. Of them, development of a polymer electrolyte membrane having excellent characteristics for use in the fuel cell is one of the most important technologies.

In the polymer electrolyte fuel cell, the electrolyte membrane acts as an "electrolyte" for conducting hydrogen ions (protons), and also acts as a "diaphragm" for preventing direct mixing of hydrogen or methanol, as a fuel, with oxygen. The polymer electrolyte membrane is required to have great ion exchange capacity; excellent chemical stability ensuring long-term use, especially, resistance to hydroxide radicals becoming a main cause of membrane deterioration (i.e., oxidation resistance); heat resistance at 80° C., the operating temperature of the cell, or at even higher temperatures; and constant and high water retention properties of the membrane for keeping electrical resistance low. To play the role of the diaphragm, on the other hand, the polymer electrolyte membrane is required to be excellent in the mechanical strength and dimensional stability of the membrane, and to have low permeability to hydrogen, methanol and oxygen.

A perfluorosulfonic acid membrane "Nafion (registered trademark of DuPont)" developed by DuPont, for example, has generally been used as the electrolyte membrane for the polymer electrolyte fuel cell. Conventional fluorine-containing polymer electrolyte membranes, such as Nafion, are excellent in chemical durability and stability. However, their ion exchange capacity is as small as 1 meq/g or so, and their water retention properties are insufficient. Thus, the drying of the ion exchange membranes occurs, resulting in decreased proton conductivity. They are also disadvantageous in that when methanol is used as a fuel, swelling of the membrane or crossover of methanol takes place. Moreover, they have been defective in that their mechanical characteristics under operating conditions involving temperatures exceeding 100° C., required for an automobile power source, markedly decline. Furthermore, the production of the fluoroplastic polymer electrolyte membranes starts with the synthesis of monomers. Thus, the number of the steps for the manufacturing process is so large that a high cost is entailed. These have been a great impediment to the commercialization of these polymer electrolyte membranes as power sources for home-oriented cogeneration systems or power sources for fuel cell vehicles.

Under these circumstances, the development of a low-cost polymer electrolyte membrane replacing the fluoroplastic polymer electrolyte membrane has been energetically carried out. For example, attempts have been made to prepare electrolyte membranes for the polymer electrolyte fuel cells by introducing styrene monomers into fluoropolymer membrane substrates, such as polytetrafluoroethylene, polyvinylidene fluoride, and ethylene-tetrafluoroethylene copolymer, by graft polymerization, and then sulfonating the graft polymers (see Patent Documents 1 and 2). However, the fluoropolymer membrane substrates have a low glass transition temperature, so that their mechanical strength at high temperatures of 100° C. or higher considerably declines. When a high electric current is flowed through the membrane for a long time, moreover, the sulfonic groups introduced into the polystyrene become detached, resulting in the marked lowering of the ion exchange capacity of the membrane. There is also the defect that crossover of hydrogen, as the fuel, or oxygen occurs.

On the other hand, a structure comprising the sulfonated form of an aromatic polymer membrane having excellent mechanical strength at high temperatures and low permeability to a fuel such as methanol, hydrogen or oxygen, typified by engineering plastics, has been proposed as a low-cost polymer electrolyte membrane. Such a sulfonated aromatic polymer electrolyte membrane is obtained by synthesizing an aromatic monomer having sulfonic groups bound thereto for taking part in proton conduction, synthesizing an aromatic polymer by its polymerization reaction, and then forming the aromatic polymer into a membrane (see Patent Documents 3, 4 and 5). If the amount of the sulfonic groups introduced is increased to enhance electrical conductivity, however, a decrease in mechanical strength or a decline in handleability occurs as water solubility increases. Further, the sulfonic groups exist randomly in an aromatic polymer chain, thus resulting in unclear separation between a hydrophobic portion for maintaining mechanical strength and an electrolyte layer in charge of proton conduction. Hence, the above sulfonated aromatic polymer electrolyte membrane has been poor in proton conductivity, fuel impermeability, and durability during long-term operation, typified by oxidation resistance, as compared with polymer electrolyte membranes having a phase-separated structure, such as polymer electrolyte membranes obtained by graft polymerization, and commercially available fluoropolymer electrolyte membranes (such as Nafion).

Patent Document 1: JP-A-2001-348439
Patent Document 2: JP-A-2004-246376
Patent Document 3: JP-A-2004-288497
Patent Document 4: JP-A-2004-346163
Patent Document 5: JP-A-2006-12791

DISCLOSURE OF THE INVENTION

Problems to be Solved by the Invention

The present invention aims to resolve the decrease in mechanical strength at high temperatures and the crossover of fuel, which are the problems with the fluororesin electrolytes, and to achieve a reconciliation between proton conductivity and mechanical strength/handleability which is a challenge for the sulfonated aromatic polymer electrolyte membrane. For this purpose, the present invention introduces graft chains into an aromatic polymer membrane by graft polymerization, and then sulfonates the graft chains or/and the aromatic polymer chain, thereby providing a polymer electrolyte membrane having excellent proton conductivity, fuel impermeability, and durability during long-term operation, such as oxidation resistance.

Means for Solving the Problems

The present invention provides a polymer electrolyte membrane having high proton conductivity, high mechanical characteristics at high temperatures, and high durability during long-term operation, such as oxidation resistance, and having low fuel permeability, the polymer electrolyte membrane being suitable for use in a fuel cell; and a method for producing the polymer electrolyte membrane.

That is, the present invention is the provision of a polymer electrolyte membrane, which is characterized by preparing the polymer electrolyte membrane by graft-polymerizing a vinyl monomer onto an aromatic polymer membrane substrate, and then chemically converting some of the graft chains or/and part of the aromatic polymer chain into sulfonic groups; and a method for producing the polymer electrolyte membrane.

The aromatic polymer membrane substrate is preferably a polymer membrane substrate having a polyether ether ketone structure, a polyimide structure, a polysulfone structure, or a polyester structure.

Advantages of the Invention

The polymer electrolyte membrane produced by the present invention can be produced at a very low cost in comparison with a fluoroplastic polymer electrolyte membrane, but shows high mechanical characteristics at high temperatures, and low fuel permeability. Because of graft chain introduction by graft polymerization, moreover, the polymer electrolyte membrane has characteristics fulfilling both of high proton conductivity and oxidation resistance, as compared with conventional sulfonated aromatic polymer electrolyte membranes. Thus, it is suitable, particularly, for use in home-oriented cogeneration systems desired to have long-term durability, or in fuel cells for automobiles which can withstand use at high temperatures of 100° C. or higher.

BEST MODE FOR CARRYING OUT THE INVENTION

The aromatic polymer membrane substrate usable in the present invention is not restricted, as long as it is a polymer membrane comprising an aromatic hydrocarbon. It is, for example, an aromatic polymer membrane substrate such as a polyether ketone derivative, a polyimide derivative, a polysulfone derivative, a polyester derivative, a polyamide derivative, a polycarbonate, a polyphenylene sulfide, or a polybenzimidazole. Polyether ether ketone is preferred as an example of the polyether ketone derivative, since it can maintain a membranous shape in a reaction solution for graft polymerization and sulfonation, and the resulting polymer electrolyte membrane shows high mechanical characteristics. Polyether imide is preferred as an example of the polyimide derivative, since it can maintain a membranous shape in a reaction solution for graft polymerization and sulfonation, and the resulting polymer electrolyte membrane shows high mechanical characteristics. Polysulfone is preferred as an example of the polysulfone derivative, since it can maintain a membranous shape in a reaction solution for graft polymerization and sulfonation, and the resulting polymer electrolyte membrane shows high mechanical characteristics. Polyethylene naphthalate and liquid crystal polyester are preferred as examples of the polyester derivative, since it can maintain a membranous shape in a reaction solution for graft polymerization and sulfonation, and the resulting polymer electrolyte membranes show high mechanical characteristics.

In the present invention, examples of the vinyl monomer graft-polymerized onto the aromatic polymer membrane substrate are (1) a vinyl monomer having an aromatic ring capable of holding a sulfonic group, (2) a vinyl monomer having a sulfonyl halide group or a sulfonic ester group which can be converted into a sulfonic group by hydrolysis, (3) a vinyl monomer having a halogen into which a sulfonic group can be introduced by a sulfonation reaction, and (4) an aliphatic vinyl monomer, an aromatic ring-containing vinyl monomer, or a perfluoroalkyl vinyl monomer which is not sulfonated by an electrophilic substitution sulfonation reaction onto an aromatic polymer chain.

Examples of (1) the vinyl monomer having an aromatic ring capable of holding a sulfonic group are styrene; alkylstyrenes such as α-methylstyrene, 4-vinyltoluene, and 4-tert-butylstyrene; halogenated styrenes such as 2-chlorostyrene, 4-chlorostyrene, 2-bromostyrene, 3-bromostyrene, 4-bromostyrene, 2-fluorostyrene, 3-fluorostyrene, and 4-fluorostyrene; alkoxystyrenes such as 4-methoxystyrene, 4-methoxymethylstyrene, 2,4-dimethoxystyrene, and vinylphenylallyl ethers; and hydroxystyrene derivatives such as 4-hydroxystyrene, 4-acetoxystyrene, 4-tert-butyloxystyrene, 4-tert-butyloxycarbonyloxystyrene, and 4-vinylbenzylalkyl ether.

Examples of (2) the vinyl monomer having a sulfonyl halide group, a sulfonic ester group, or a sulfonic acid salt group which can be converted into a sulfonic group by hydrolysis are 4-vinylbenzenesulfonic acid sodium salt, 4-vinylbenzylsulfonic acid sodium salt, 4-methoxysulfonylstyrene, 4-ethoxysulfonylstyrene, 4-styrenesulfonyl fluoride, and perfluoro(fluorosulfonylalkyl vinyl ether) derivatives such as $CF_2=CF—O—(CF_2)n-SO_2F$ (where n=1 to 5) and $CF_2=CF—O—CF_2—CF(CF_3)—O—(CF_2)n-SO_2F$ (where n=1 to 5), and fluorosulfonyltetrafluorovinyl derivatives such as $CF_2=CF—SO_2F$.

Examples of (3) the vinyl monomer having a halogen into which a sulfonic group can be introduced by a sulfonation reaction are 4-chloromethylstyrene, $CH_2=CH—O—(CH_2)n-X$ (where n denotes 1 to 5, and X represents a halogen group being chlorine or fluorine), $CF_2=CF—O—(CH_2)n-X$ (where n denotes 1 to 5, and X represents a halogen group being chlorine or fluorine), $CH_2=CH—O—(CF_2)n-X$ (where n denotes 1 to 5, and X represents a halogen group being chlorine or fluorine), $CF_2=CF—O—(CF_2)n-X$ (where n denotes 1 to 5, and X represents a halogen group being chlorine or fluorine), and $CF_2=CF—O—CF_2—CF(CF_3)—O—(CF_2)n-X$ (where n denotes 1 to 5, and X represents a halogen group being chlorine or fluorine).

Examples of (4) the aliphatic vinyl monomer, the aromatic ring-containing vinyl monomer, or the perfluoroalkyl vinyl monomer which is not sulfonated by an electrophilic substitution sulfonation reaction onto an aromatic polymer chain are acrylonitrile, acrylic acid, acrylic acid derivatives such as methyl acrylate, methacrylic acid, methacrylic acid derivatives such as methyl methacrylate, alkyl-substituted styrene derivatives such as 2,4,6-trimethylstyrene, electron-deficient aromatic vinyl monomer derivatives such as tetrafluorostyrene, 4-fluorostyrene, and 4-chlorostyrene, alkyl vinyl ether derivatives such as $CH_2=CH-O-(CH_2)n-CH_3$ (where n denotes 1 to 5), $CF_2=CF-O-(CH_2)n-CH_3$ (where n denotes 1 to 5), and $CH_2=CH-O-(CF_2)n-CF_3$ (where n denotes 1 to 5), and perfluoroalkyl vinyl ether derivatives such as $CF_2=CF-O-(CF_2)n-CF_3$ (where n denotes 1 to 5), and $CF_2=CF-O-CF_2-CF(CF_3)-O-(CF_2)n-CF_3$ (where n denotes 1 to 5).

By using a crosslinking agent, such as a multifunctional monomer, in combination with the vinyl monomer, it also becomes possible to crosslink the graft chain. After graft polymerization, it is also possible to form a crosslink within the graft chains, form a crosslink within the aromatic polymer chains, or crosslink the graft chain with the aromatic polymer chain by addition of a multifunctional monomer, or irradiation with radiation. Examples of the multifunctional monomer used as the crosslinking agent are bis(vinylphenyl)ethane, divinylbenzene, 2,4,6-triallyloxy-1,3,5-triazine (i.e., triallyl cyanurate), triallyl-1,2,4-benzenetricarboxylate (i.e., triallyl trimellitate), diallyl ether, bis(vinylphenyl)methane, divinyl ether, 1,5-hexadiene, and butadiene. The crosslinking agent is preferably used in a proportion by weight of 10% or less to the vinyl monomer. If more than 10% of the crosslinking agent is used, the resulting polymer electrolyte membrane becomes brittle.

The higher electrical conductivity in positive correlation with ion exchange capacity the polymer electrolyte membrane has, the better performance the polymer electrolyte membrane shows. The ion exchange capacity refers to the amount (mmol/g) of ion exchange groups per gram weight of the dry electrolyte membrane. However, if the electrical conductivity of the ion exchange membrane at 25° C. is 0.02 $([\Omega \cdot cm]^{-1})$ or less, the output performance of the fuel cell markedly lowers in most cases. Thus, the electrical conductivity of the polymer electrolyte membrane is often designed to be 0.02 $([\Omega \cdot cm]^{-1})$ or more, and the electrical conductivity of the polymer electrolyte membrane with higher performance is often designed to be 0.10 $([\Omega \cdot cm]^{-1})$ or more.

In the present invention, the polymer electrolyte membrane is prepared by graft polymerization with the vinyl monomer, followed by chemical conversion into sulfonic groups, by use of radicals generated on the aromatic polymer membrane substrate under the action of radiation. Thus, the ion exchange capacity, accordingly, the electrical conductivity, of the resulting membrane can be controlled by controlling the grafting rate or the sulfonation rate.

In the present invention, the radiation is thrown onto the aromatic polymer membrane substrate at a dose of 1 to 1000 kGy, more preferably 10 to 500 kGy, at room temperature to 150° C. under an inert gas or in the presence of oxygen. At a dose of 10 kGy or less, it is difficult to obtain a grafting rate necessary for obtaining conductivity of 0.02 $([\Omega \cdot cm]^{-1})$ or more. At a dose of 500 kGy or more, the polymer membrane substrate becomes brittle. Graft polymerization can be carried out by a simultaneous irradiation method which comprises simultaneously irradiating the aromatic polymer membrane substrate and the monomer with radiation for graft polymerization, or a prior irradiation method which comprises irradiating the aromatic polymer membrane substrate with radiation priorly, and then bringing it contact with the vinyl monomer for graft polymerization.

For the graft polymerization of the polymer membrane substrate, it is common practice to immerse the polymer membrane substrate in a vinyl monomer liquid. In the present invention, however, the graft polymerizability of the polymer substrate, and the retention of the membranous shape, in the polymerization solution, of the graft polymer membrane substrate upon graft polymerization are of importance to the graft polymerization of the vinyl monomer onto the aromatic polymer membrane substrate. From these points of view, there is used a method in which the polymer membrane substrate is immersed in a vinyl monomer solution diluted with a solvent such as dichloroethane, chloroform, N-methylformamide, N-methylacetamide, N-methylpyrrolidone, γ-butyrolactone, n-hexane, methanol, ethanol, 1-propanol, t-butanol, toluene, cyclohexane, cyclohexanone, or dimethyl sulfoxide. The use of an amide-based solvent, which swells the aromatic polymer membrane substrate, as the graft polymerization solvent promotes the penetration of the vinyl monomer into the polymer membrane substrate to increase the grafting rate. Examples of the amide-based solvent are N-methylformamide and N-methylpyrrolidone. Further, the use of an alcohol having low solvent action on the vinyl monomer, or an aqueous solution of the alcohol results in the efficient migration of the vinyl monomer into the aromatic polymer membrane substrate during the process of graft polymerization, thus promoting graft polymerization. Examples of such an alcohol are methanol, ethanol, 1-propanol, 2-propanol, 1-butanol, and their aqueous solutions.

In the present invention, the grafting rate is 2 to 120% by weight, more preferably 4 to 80% by weight, based on the polymer membrane substrate. At a grafting rate of 4% by weight or lower, conductivity of 0.02 $([\Omega \cdot cm]^{-1})$ or more is difficult to obtain. At a grafting rate of 80% by weight or higher, a sufficient mechanical strength of the graft polymer membrane is not obtained.

In the present invention, the method of introducing sulfonic groups differs according to the vinyl monomers (1) to (4) for use in graft polymerization. In the graft polymer membrane obtained from the vinyl monomer (1), sulfonation of the aromatic ring in the graft chain can be performed by reaction with a dichloroethane solution or a chloroform solution of concentrated sulfuric acid, fuming sulfuric acid, or chlorosulfonic acid. The sulfonation rate for showing conductivity, which permits application to the polymer electrolyte membrane, differs according to the grafting rate of the graft polymer membrane. The value of the sulfonation rate is 100% when one molecule of sulfonic acid is introduced per vinyl monomer unit of the graft chain. The sulfonation rate is preferably adjusted to 10 to 150% by changing the reaction time and the reaction temperature.

More preferably, the sulfonation rate is 30 to 100%. At a sulfonation rate of 30% or less, conductivity of 0.02 $([\Omega \cdot cm]^{-1})$ or more is difficult to obtain. At a sulfonation rate of 100% or more, the heat resistance and oxidation resistance of the graft chain markedly lower.

In the graft polymer membrane obtained from the vinyl monomer (2), hydrolysis of the sulfonyl halide group, the sulfonic ester group, or the sulfonic acid salt group in the graft chain into the sulfonic group can be performed by treatment with a neutral aqueous solution, an alkaline aqueous solution or an acidic aqueous solution. In the graft copolymerization with a vinyl monomer other than the vinyl monomer (2), it is preferred to change its composition ratio, thereby adjusting the sulfonation rate to 10 to 100%. More preferably, the sulfonation rate is 30 to 100%. At a sulfonation rate of 30% or less, conductivity of 0.02 $([\Omega \cdot cm]^{-1})$ or more is difficult to obtain. At a sulfonation rate of 100% or more, the heat resistance and oxidation resistance of the graft chain markedly lower.

In the graft polymer membrane obtained from the vinyl monomer (3), chemical conversion of the halogen atom in the graft chain into the sulfonic acid salt can be performed by treatment with an aqueous solution of sodium sulfite, an aqueous solution of sodium hydrogen sulfite, or a mixed solution of them and dimethyl sulfoxide. In the graft copolymerization with a vinyl monomer other than the vinyl monomer (3), it is preferred to change its composition ratio, thereby adjusting the sulfonation rate to 10 to 100%. More preferably, the sulfonation rate is 30 to 100%. At a sulfonation rate of 30% or less, conductivity of 0.02 ($[\Omega \cdot cm]^{-1}$) or more is difficult to obtain. At a sulfonation rate of 100% or more, the heat resistance and oxidation resistance of the graft chain markedly lower.

The graft polymer membrane obtained from the vinyl monomer (4) is different from the thus far reported polymer electrolyte membrane prepared using radiation-induced graft polymerization, and from the polymer electrolyte membrane prepared using any of the above-mentioned vinyl monomers (1) to (3) in the present invention. The graft polymer membrane obtained from the vinyl monomer (4) is characterized in that as a result of sulfonation of the polymer membrane substrate, the region derived from the polymer membrane substrate works as a hydrophilic phase responsible for electroconductivity, while the graft chains act as a hydrophobic matrix phase in charge of mechanical strength. Thus, the vinyl monomer (4) to be graft polymerized is not limited, as long as it has mechanical characteristics and heat resistance. Preferably, a crosslinking agent, such as a multifunctional monomer, is used in combination with the vinyl monomer, whereby the mechanical strength and heat resistance are further enhanced. Moreover, the graft polymer membrane after graft polymerization, or the polymer electrolyte membrane after sulfonation is heat-treated, whereby crosslinking structures are further introduced onto the graft chains to enhance the mechanical strength and heat resistance. Sulfonation of the aromatic ring in the aromatic substrate membrane can be performed by reaction with a dichloroethane solution or a chloroform solution of concentrated sulfuric acid, fuming sulfuric acid, or chlorosulfonic acid. The sulfonation rate for showing conductivity, which permits application to the polymer electrolyte membrane, differs according to the grafting rate of the graft polymer membrane. Thus, the sulfonation rate is preferably adjusted to 10 to 150% by changing the reaction time and the reaction temperature. More preferably, the sulfonation rate is 20 to 100%. At a sulfonation rate of 20% or less, conductivity of 0.02 ($[\Omega \cdot cm]^{-1}$) or more is difficult to obtain. At a sulfonation rate of 100% or more, the heat resistance and oxidation resistance of the graft chain markedly lower.

In the present invention, in order to increase the electrical conductivity of the polymer electrolyte membrane, it is conceivable to thin the polymer electrolyte membrane. Under the current circumstances, however, an excessively thin polymer electrolyte membrane is easily broken, and the membrane itself is difficult to produce. In the present invention, therefore, the polymer electrolyte membrane with a thickness of 30 to 200 μm is preferred, and the polymer electrolyte membrane with a thickness of 20 to 100 μm is more preferred.

In the present invention, the energy imparted by radiation acts on the aromatic polymer chain to generate, on the polymer chain, activated species such as radicals for initiating the graft polymerization of the vinyl monomer. Thus, the radiation is not limited to a particular radiation, as long as it is an energy source which causes the reaction for generating activated species, such as radicals, on the polymer chain. Examples of the radiation are gamma rays, electron rays, an ion beam, and X-rays.

EXAMPLES

The present invention will now be described by Examples and Comparative Examples, which in no way limit the invention. The measured values were obtained by measurements described below.

(1) Grafting Rate (%)

Let the polymer membrane substrate be a main chain portion, and the portion graft-polymerized with the vinyl monomer be a graft chain portion. Then, the weight ratio of the graft chain portion to the main chain portion is expressed as a grafting rate which satisfies the following equation ($X_{dg}$ [wt. %]):

$$X_{dg} = 100(W_2 - W_1)/W_1 \qquad \text{[Equation 1]}$$

$W_1$: Weight (g) in dry state before grafting
$W_2$: Weight (g) in dry state after grafting (2) Ion Exchange Capacity (meq/g)

The ion exchange capacity (IEC) of the polymer electrolyte membrane is represented by the following equation:

$$IEC = [n(\text{acidic group})_{obs}]/W_d (mM/g) \qquad \text{[Equation 2]}$$

[n(acidic group)$_{obs}$]: Amount (mM) of acidic groups in polymer electrolyte membrane
$W_d$: Dry weight (g) of polymer electrolyte membrane The measurement of [n(acidic group)$_{obs}$] was made by immersing the polymer electrolyte membrane in a 1 M sulfuric acid solution for 4 hours at 50° C. to convert it into a proton type (H-type) completely, and then immersing the polymer electrolyte membrane in a 3 M aqueous solution of NaCl at 50° C. for 4 hours to convert it into —SO$_3$Na type again. After the polymer electrolyte membrane was withdrawn, the remaining NaCl aqueous solution was acid-base titrated with 0.2 M NaOH to determine the acidic group concentration of the polymer electrolyte membrane as the amount of protons (H$^+$) substituted.

(3) Water Content (%)

At room temperature, the H-type polymer electrolyte membrane preserved in water was withdrawn. After water on its surface was lightly wiped off (about 1 minute later), the weight was measured (W (g)). This membrane was dried in a vacuum for 16 hours at 60° C., and then measured for weight, whereby the dry weight $W_d$ (g) of the polymer electrolyte membrane was determined. The water content was calculated from the following equation based on $W_s$ and $W_d$:

$$\text{Water content} = 100(W_s - W_d)/W_d \qquad \text{[Equation 3]}$$

(4) Electrical Conductivity ($\Omega^{-1}$ cm$^{-1}$)

In accordance with measurement by the alternating current method (Shin Jikken Kagaku Koza (New Lecture on Experimental Chemistry) 19, Kobunshi Kagaku (Polymer Chemistry) (II), p. 998, Maruzen Co., Ltd.), the membrane resistance (Rm) of the polymer electrolyte membrane was measured using an ordinary membrane resistance measuring cell and Hewlett-Packard's LCR meter, E-4925A. A 1 M aqueous solution of sulfuric acid was filled into the cell, and resistance between two platinum electrodes (distance 5 mm) was measured. The electrical conductivity of the polymer electrolyte membrane was calculated using the following equation:

$$\kappa = l/Rm \cdot d/S \qquad \text{[Equation 4]}$$

κ: Electrical conductivity ($\Omega^{-1}$ cm$^{-1}$) of polymer electrolyte membrane
d: Thickness (cm) of polymer electrolyte membrane
S: Current-carrying area (cm$^2$) of polymer electrolyte membrane (5) Oxidation Resistance (Weight Remaining Rate, %)

The weight of the polymer electrolyte membrane after drying under vacuum for 16 hours at 60° C. was designated as $W_3$, and the dry weight of the electrolyte membrane after immersion for 24 hours in a 3% solution of hydrogen peroxide at 80° C. was designated as $W_4$.

$$\text{Oxidation resistance} = 100(W_4/W_3)(\%) \qquad \text{[Equation 5]}$$

Example 1

A 2 cm×3 cm polyether ether ketone (hereinafter referred to as PEEK) membrane (membrane thickness 25 μm) was placed in a separable glass container with a cock, and deaerated therein, whereafter the interior of the glass container was purged with an argon gas. In this state, the PEEK membrane was irradiated with γ-rays from a $^{60}$Co radiation source at a radiation dose of 30 kGy at room temperature. Then, 20 g of a 1-propanol solution of 50 wt. % styrene, which had been deaerated by bubbling an argon gas, was added into the glass container so that the irradiated PEEK membrane would be immersed therein. After purging with an argon gas, the glass container was hermetically sealed, and allowed to stand for 48 hours at 80° C. The resulting graft polymer membrane was washed with cumene, and dried. Then, the polymer membrane was allowed to stand in a 1,2-dichloroethane solution of 0.05 M chlorosulfonic acid for 8 hours at 0° C., and then hydrolyzed by washing with water, to obtain a polymer electrolyte membrane. The grafting rate, ion exchange capacity, and electrical conductivity of the polymer electrolyte membrane obtained in the present Example are shown in Table 1.

TABLE 1

Characteristics of polymer electrolyte membrane

| | Grafting rate (%) | Ion exchange capacity (meq/g) | Electrical conductivity ($[\Omega \cdot cm]^{-1}$) | Oxidation resistance (weight remaining rate) |
|---|---|---|---|---|
| Ex. 1 | 50 | 1.7 | 0.052 | 96 |
| Ex. 2 | 28 | 1.3 | 0.031 | 92 |
| Ex. 3 | 38 | 2.0 | 0.11 | 100 |
| Ex. 4 | 40 | 1.8 | 0.046 | 95 |
| Ex. 5 | 45 | 2.2 | 0.13 | 99 |
| Ex. 6 | 34 | 1.2 | 0.0078 | 96 |
| Ex. 7 | 42 | 1.5 | 0.011 | 99 |
| Ex. 8 | 28 | 1.1 | 0.047 | 99 |
| Ex. 9 | 32 | 1.9 | 0.097 | 100 |
| Comp. Ex. 2 | — | 0.40 | 0.0022 | 53 |
| Comp. Ex. 4 | — | 0.68 | 0.013 | 25 |
| Comp. Ex. 6 | — | 0.59 | 0.0096 | 33 |
| Comp. Ex. 7 Nafion 112 | — | 0.9 | 0.06 | 100 |

Example 2

A 2 cm×3 cm PEEK membrane (membrane thickness 25 μm) was placed in a separable glass container with a cock, and deaerated therein, whereafter the interior of the glass container was purged with an argon gas. In this state, the PEEK membrane was irradiated with γ-rays from a $^{60}$Co radiation source at a radiation dose of 100 kGy at room temperature. Then, 20 g of an N-methylpyrrolidone solution of 50 wt. % ethyl p-styrenesulfonate, which had been deaerated by bubbling an argon gas, was added into the glass container so that the irradiated PEEK membrane would be immersed therein. After purging with an argon gas, the glass container was hermetically sealed, and allowed to stand for 12 hours at 80° C. The resulting graft polymer membrane was washed with N-methylpyrrolidone, and dried. Then, the graft polymer membrane was immersed in a 0.5 M aqueous solution of hydrochloric acid for 12 hours at 80° C. to hydrolyze the sulfonic esters on the graft chains, followed by washing with water, to obtain a polymer electrolyte membrane having sulfonic groups on the graft chains. The grafting rate, ion exchange capacity, and electrical conductivity of the polymer electrolyte membrane obtained in the present Example are shown in Table 1.

Example 3

A 2 cm×3 cm PEEK membrane (25 μm) was placed in a separable glass container with a cock, and deaerated therein, whereafter the interior of the glass container was purged with an argon gas. In this state, the PEEK membrane was irradiated with γ-rays from a $^{60}$Co radiation source at a radiation dose of 30 kGy at room temperature. Then, 20 g of a 1-propanol solution of 50 wt. % acrylonitrile, which had been deaerated by bubbling an argon gas, was added into the glass container so that the PEEK membrane would be immersed therein. After purging with an argon gas, the glass container was hermetically sealed, and allowed to stand for 24 hours at 80° C. The resulting graft polymer membrane was washed with cumene, and dried. Then, the graft polymer membrane was allowed to stand for 3 hours at 200° C. in a nitrogen atmosphere to crosslink and cyclize the polyacrylonitrile graft chains.

The crosslinked graft membrane was treated in a 1,2-dichloroethane solution of 0.05 M chlorosulfonic acid for 8 hours at 0° C., and then hydrolyzed by washing with water, to obtain a polymer electrolyte membrane having sulfonic groups on the aromatic polymer chain. The grafting rate, ion exchange capacity, and electrical conductivity of the polymer electrolyte membrane obtained in the present Example are shown in Table 1.

Example 4

A 2 cm×3 cm polyether imide (hereinafter referred to as PEI) membrane (50 μm) was placed in a separable glass container with a cock, and deaerated therein, whereafter the interior of the glass container was purged with an argon gas. In this state, the PEI membrane was irradiated with γ-rays from a $^{60}$Co radiation source at a radiation dose of 100 kGy at room temperature. Then, 20 g of a 1-propanol solution of 70 wt. % styrene, which had been deaerated by bubbling an argon gas, was added into the glass container so that the PEI membrane would be immersed therein. After purging with an argon gas, the glass container was hermetically sealed, and allowed to stand for 24 hours at 60° C. The resulting graft polymer membrane was washed with cumene, and dried. Then, the graft polymer membrane was allowed to stand for 1 hour at 0° C. in a 1,2-dichloroethane solution of 0.02 M chlorosulfonic acid, and then hydrolyzed by washing with water, to obtain a polymer electrolyte membrane. The grafting rate, ion exchange capacity, and electrical conductivity of the polymer electrolyte membrane obtained in the present Example are shown in Table 1.

Example 5

A 2 cm×3 cm PEI membrane (50 μm) was placed in a separable glass container with a cock, and deaerated therein, whereafter the interior of the glass container was purged with an argon gas. In this state, the PEI membrane was irradiated with γ-rays from a $^{60}$Co radiation source at a radiation dose of 30 kGy at room temperature. Then, 20 g of a 1-propanol solution of 70 wt. % acrylonitrile, which had been deaerated by bubbling an argon gas, was added into the glass container so that the PEI membrane would be immersed therein. After purging with an argon gas, the glass container was hermetically sealed, and allowed to stand for 24 hours at 60° C. The resulting graft polymer membrane was washed with cumene, and dried. Then, the graft polymer membrane was allowed to stand for 3 hours at 200° C. in a nitrogen atmosphere to crosslink and cyclize the polyacrylonitrile graft chains. The crosslinked graft membrane was treated in a 1,2-dichloroethane solution of 0.02 M chlorosulfonic acid for 1 hour at 0° C., and then hydrolyzed by washing with water, to obtain a polymer electrolyte membrane having sulfonic groups on the aromatic polymer chain. The grafting rate, ion exchange capacity, and electrical conductivity of the polymer electrolyte membrane obtained in the present Example are shown in Table 1.

Example 6

A 2 cm×3 cm polysulfone (hereinafter referred to as PSU) membrane (50 μm) was placed in a separable glass container with a cock, and deaerated therein, whereafter the interior of the glass container was purged with an argon gas. In this state, the PSU membrane was irradiated with γ-rays from a $^{60}$Co radiation source at a radiation dose of 30 kGy at room temperature. Then, 20 g of a 1-propanol solution of 50 wt. % styrene, which had been deaerated by bubbling an argon gas, was added into the glass container so that the PSU membrane would be immersed therein. After purging with an argon gas, the glass container was hermetically sealed, and allowed to stand for 48 hours at 40° C. The resulting graft polymer membrane was washed with cumene, and dried. Then, the graft polymer membrane was allowed to stand for 3 hours at 0° C. in a 1,2-dichloroethane solution of 0.02 M chlorosulfonic acid, and then hydrolyzed by washing with water, to obtain a polymer electrolyte membrane. The grafting rate, ion exchange capacity, and electrical conductivity of the polymer electrolyte membrane obtained in the present Example are shown in Table 1.

Example 7

A 2 cm×3 cm PSU membrane (50 μm) was placed in a separable glass container with a cock, and deaerated therein, whereafter the interior of the glass container was purged with an argon gas. In this state, the PSU membrane was irradiated with γ-rays from a $^{60}$Co radiation source at a radiation dose of 30 kGy at room temperature. Then, 20 g of a 1-propanol solution of 50 wt. % acrylonitrile, which had been deaerated by bubbling an argon gas, was added into the glass container so that the PSU membrane would be immersed therein. After purging with an argon gas, the glass container was hermetically sealed, and allowed to stand for 24 hours at 60° C. The resulting graft polymer membrane was washed with cumene, and dried. Then, the graft polymer membrane was allowed to stand for 3 hours at 200° C. in a nitrogen atmosphere to crosslink and cyclize the polyacrylonitrile graft chains. The crosslinked graft membrane was treated in a 1,2-dichloroethane solution of 0.02 M chlorosulfonic acid for 3 hours at 0° C., and then hydrolyzed by washing with water, to obtain a polymer electrolyte membrane having sulfonic groups on the aromatic polymer backbone chain. The grafting rate, ion exchange capacity, and electrical conductivity of the polymer electrolyte membrane obtained in the present Example are shown in Table 1.

Example 8

A 2 cm×3 cm liquid crystal polyester (hereinafter referred to as LCP) membrane (membrane thickness 25 μm) was placed in a separable glass container with a cock, and deaerated therein, whereafter the interior of the glass container was purged with an argon gas. In this state, the LCP membrane was irradiated with γ-rays from a $^{60}$Co radiation source at a radiation dose of 60 kGy at room temperature. Then, 20 g of a 1-propanol solution of 50 wt. % styrene, which had been deaerated by bubbling an argon gas, was added into the glass container so that the irradiated LCP membrane would be immersed therein. After purging with an argon gas, the glass container was hermetically sealed, and allowed to stand for 48 hours at 80° C. The resulting graft polymer membrane was washed with cumene, and dried. Then, the graft polymer membrane was allowed to stand for 8 hours at 0° C. in a 1,2-dichloroethane solution of 0.05 M chlorosulfonic acid, and then hydrolyzed by washing with water, to obtain a polymer electrolyte membrane. The grafting rate, ion exchange capacity, and electrical conductivity of the polymer electrolyte membrane obtained in the present Example are shown in Table 1.

Example 9

A 2 cm×3 cm LCP membrane (25 μm) was placed in a separable glass container with a cock, and deaerated therein, whereafter the interior of the glass container was purged with an argon gas. In this state, the LCP membrane was irradiated with γ-rays from a $^{60}$Co radiation source at a radiation dose of 30 kGy at room temperature. Then, 20 g of a 1-propanol solution of 50 wt. % acrylonitrile, which had been deaerated by bubbling an argon gas, was added into the glass container so that the LCP membrane would be immersed therein. After purging with an argon gas, the glass container was hermetically sealed, and allowed to stand for 24 hours at 80° C. The resulting graft polymer membrane was washed with cumene, and dried. Then, the graft polymer membrane was allowed to stand for 3 hours at 200° C. in a nitrogen atmosphere to crosslink and cyclize the polyacrylonitrile graft chains. The crosslinked graft membrane was treated in a 1,2-dichloroethane solution of 0.05 M chlorosulfonic acid for 8 hours at 0° C., and then hydrolyzed by washing with water, to obtain a polymer electrolyte membrane having sulfonic groups on the aromatic polymer chain. The grafting rate, ion exchange capacity, and electrical conductivity of the polymer electrolyte membrane obtained in the present Example are shown in Table 1.

Comparative Example 1

A 2 cm×3 cm PEEK membrane (25 μm) was treated under the same sulfonation conditions as in Example 1. This membrane completely dissolved in the reaction solution, failing to provide a polymer electrolyte membrane.

Comparative Example 2

A 2 cm×3 cm PEEK membrane (25 μm) was treated in a 1,2-dichloroethane solution of 0.05 M chlorosulfonic acid for 2 hours at 0° C., and then hydrolyzed by washing with water, to obtain a polymer electrolyte membrane. The ion exchange capacity and electrical conductivity of the polymer electrolyte membrane obtained in the present Example are shown in Comparative Example 2 of Table 1.

Comparative Example 3

A 2 cm×3 cm PEI membrane (25 μm) was treated under the same sulfonation conditions as in Example 4. This membrane completely dissolved in the reaction solution, failing to provide a polymer electrolyte membrane.

Comparative Example 4

A 2 cm×3 cm PEI membrane (50 μm) was treated in a 1,2-dichloroethane solution of 0.01 M chlorosulfonic acid for 3 hours at 0° C., and then hydrolyzed by washing with water, to obtain a polymer electrolyte membrane. The ion exchange capacity and electrical conductivity of the polymer electrolyte membrane obtained in the present Example are shown in Comparative Example 4 of Table 1.

Comparative Example 5

A 2 cm×3 cm PSU membrane (50 μm) was treated under the same sulfonation conditions as in Example 6. This membrane completely dissolved in the reaction solution, failing to provide a polymer electrolyte membrane.

Comparative Example 6

A 2 cm×3 cm PSU membrane (50 μm) was treated in a 1,2-dichloroethane solution of 0.01 M chlorosulfonic acid for 3 hours at 0° C., and then hydrolyzed by washing with water, to obtain a polymer electrolyte membrane. The ion exchange capacity and electrical conductivity of the polymer electrolyte membrane obtained in the present Example are shown in Comparative Example 6 of Table 1.

Comparative Example 7

Nafion 112 (DuPont) was measured for ion exchange capacity, electrical conductivity, and oxidation resistance. The results are shown in Comparative Example 7 of Table 1.

INDUSTRIAL APPLICABILITY

In the polymer electrolyte membrane of the present invention, graft chains can be introduced into an aromatic polymer membrane substrate, which is excellent in mechanical characteristics at high temperatures and fuel impermeability, by graft polymerization capable of controlling the structure of sulfonic groups and the sulfonation rate. Thus, the polymer electrolyte membrane of the present invention shows high proton conductivity, durability, and fuel impermeability, as compared with conventional sulfonated aromatic polymer electrolyte membranes. Hence, it can provide a polymer electrolyte membrane excellent in proton conductivity, durability, and fuel impermeability, optimal for a fuel cell expected to serve as a power source for mobile instruments, home-oriented cogeneration, and automobiles, which utilizes methanol, hydrogen or the like as a fuel.

The invention claimed is:

1. A polymer electrolyte membrane, comprising:
the membrane prepared by
graft-polymerizing a vinyl monomer onto an aromatic polymer membrane substrate by immersing the aromatic polymer membrane substrate into a liquid comprising the vinyl monomer and an amide-base solvent, thereby obtaining graft chains on the aromatic polymer membrane substrate, and
then, chemically converting some of the graft chains into sulfonic groups,
wherein only the some of the graft chains have been converted into sulfonic groups.

2. The polymer electrolyte membrane according to claim 1, wherein the aromatic polymer membrane substrate has a polyether ether ketone structure.

3. The polymer electrolyte membrane according to claim 1, wherein the aromatic polymer membrane substrate has a polyimide structure.

4. The polymer electrolyte membrane according to claim 1, wherein the aromatic polymer membrane substrate has a polysulfone structure.

5. The polymer electrolyte membrane according to claim 1, wherein the aromatic polymer membrane substrate has a polyester structure.

6. The polymer electrolyte membrane according to claim 1, wherein the graft chains are included in the polymer electrolyte membrane in a grafting rate of 4 to 80%, the grafting rate (%) defined as $100(W_2-W_1)/W_1$, where $W_1$ is a weight of the polymer electrolyte membrane in dry state before grafting and $W_2$ is a weight of the polymer electrolyte membrane in dry state after grafting.

7. The polymer electrolyte membrane according to claim 6, wherein the grafting rate is 28% to 80%.

8. A polymer electrolyte membrane, comprising:
the membrane prepared by
graft-polymerizing a vinyl monomer onto an aromatic polymer membrane substrate by immersing the aromatic polymer membrane substrate into a liquid comprising the vinyl monomer and an amide-base solvent, thereby obtaining graft chains on the aromatic polymer membrane substrate, and
then, chemically converting parts of aromatic polymer chains of the aromatic polymer membrane into sulfonic groups,
wherein only the parts of the aromatic polymer chains have been converted into sulfonic groups.

9. The polymer electrolyte membrane according to claim 8, wherein the aromatic polymer membrane substrate has a polyether ether ketone structure.

10. The polymer electrolyte membrane according to claim 8, wherein the aromatic polymer membrane substrate has a polyimide structure.

11. The polymer electrolyte membrane according to claim 8, wherein the aromatic polymer membrane substrate has a polysulfone structure.

12. The polymer electrolyte membrane according to claim 8, wherein the aromatic polymer membrane substrate has a polyester structure.

13. The polymer electrolyte membrane according to claim 8, wherein the graft chains are included in the polymer electrolyte membrane in a grafting rate of 4 to 80%, the grafting rate (%) defined as $100(W_2-W_1)/W_1$, where $W_1$ is a weight of the polymer electrolyte membrane in dry state before grafting and $W_2$ is a weight of the polymer electrolyte membrane in dry state after grafting.

14. The polymer electrolyte membrane according to claim 13, wherein the grafting rate is 28% to 80%.

* * * * *